United States Patent [19]

Kawasaki et al.

[11] Patent Number: 4,479,062
[45] Date of Patent: Oct. 23, 1984

[54] PHOTO-ELECTRIC CONVERSION DEVICE WITH ACCUMULATION TIME CONTROL

[75] Inventors: Masahiro Kawasaki; Harumi Aoki; Koji Suzuki, all of Tokyo, Japan

[73] Assignee: Asahi Kogaku Kogyo Kabushiki Kaisha, Tokyo, Japan

[21] Appl. No.: 345,122

[22] Filed: Feb. 2, 1982

[30] Foreign Application Priority Data

Feb. 6, 1981 [JP] Japan .................................. 55-16355
Feb. 6, 1981 [JP] Japan .................................. 55-16356

[51] Int. Cl.³ .......................................... H01J 40/14
[52] U.S. Cl. .................................. 250/578; 358/213
[58] Field of Search ............... 250/211 R, 211 J, 578, 250/214 R; 358/211, 212, 213; 357/24 LR, 31, 32

[56] References Cited

U.S. PATENT DOCUMENTS

| | | | |
|---|---|---|---|
| 3,944,816 | 3/1976 | Harada | 250/211 J |
| 4,280,141 | 7/1981 | McCaan et al. | 358/213 |
| 4,340,819 | 7/1982 | Ogasawara et al. | 250/578 |

*Primary Examiner*—David C. Nelms
*Attorney, Agent, or Firm*—Sughrue, Mion, Zinn, Macpeak & Seas

[57] ABSTRACT

A photo-electric conversion device is provided with a light receiving array and circuits serving to scan the same. A light receiving device separate from the array but adjacent thereto is used as a part of a control device for controlling the accumulation time of the array. A saturation detection circuit may be arranged to receive the output of the array and to vary the accumulation time by a suitable factor when array saturation occurs. The conversion device may also be provided with means for compensating for leakage currents in the conversion block, so as to facilitate higher linearity at low illumination intensities.

5 Claims, 8 Drawing Figures

PHOTO-ELECTRIC CONVERSION DEVICE WITH ACCUMULATION TIME CONTROL

BACKGROUND OF THE INVENTION

This invention relates to photo-electric conversion devices in which the light receiving elements in a light receiving element array utilizing an accumulation effect are scanned to output charges corresponding to the quantities of incident light accumulated in the elements, and more particularly to a photo-electric conversion device in which the accumulation time is varied according to information regarding the incident light.

In the case where a light receiving element array using an accumulation effect is utilized for an automatic focusing device of a camera or the like, the range of illumination intensity used thereby is considerably wide. Therefore, if the accumulation time of the light receiving element array is made constant, it is impossible to obtain a sufficiently wide range of illumination intensity. Furthermore, since the output level varies with the illumination intensity, the processing circuit is unavoidably intricate.

In order to eliminate such difficulties, a system has been proposed in which the accumulation time of the light receiving element array is varied according to information regarding the incident light. For instance, a system is disclosed by in Japanese Patent Application Laid-Open No. 140510/1976 which comprises a photo-electric conversion block which includes a light receiving element array for accumulating information on incident light through an accumulation effect, a circuit for scanning the light receiving elements in the light receiving element array successively, and a detector for generating a signal corresponding to the average value of the light intensities applied to the light receiving elements; a circuit for producing an output having a frequency corresponding to the output of the detector in the block; and a circuit for converting the output of the oscillating circuit into a scanning signal, so that when the average value of the light intensities applied to the conversion block is large, the scanning operation is carried out at a relatively high speed to prevent the operating regions of the elements from being saturated; and for outputting information from the elements successively.

According to this system, even if the average level of the light receiving element array is changed, it is possible to output the information from the elements effectively within the dynamic range. However, in this system, when high intensity light is applied to several bits in the light receiving element array and low intensity light is applied to the remaining bits, the average level is determined by the low intensity light. Accordingly, the accumulation time is increased, and the several bits to which the high intensity light is applied are saturated. Moreover, the known system has a further drawback, in that at a low intensity of illumination, sufficiently high linearity cannot be obtained because of a leakage current in the photo-electric conversion block.

SUMMARY OF THE INVENTION

In view of the foregoing, the objects of this invention are to provide a photo-electric conversion device in which the light receiving elements in an accumulation effect-type light receiving element array are scanned to output charges corresponding to the quantities of incident light accumulated in the elements, where the accumulation time is varied according to information regarding the incident light, which device is made up of simple circuits; and to improve the linearity of such a device at low illumination intensities.

DETAILED DESCRIPTION OF THE PREFERRED EMBODIMENTS

Figure 1:
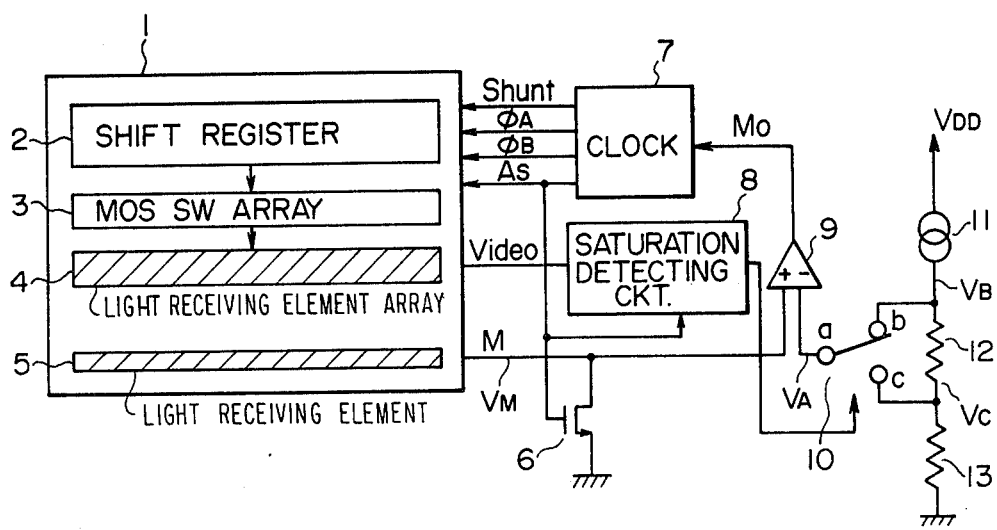
FIG. 1 is a block diagram showing a first embodiment of the invention.

FIG. 1 is a block diagram showing one embodiment of the invention. In FIG. 1, reference numeral 1 designates a photo-electric conversion section which is made up of a shift register 2, a MOS switch array 3, a light receiving element array 4 and a light receiving element 5. In the photo-electric conversion section 1, the light receiving element array 4 and the light receiving element 5 sense light while the remaining components are shielded from the light by an aluminum mask. The output M of the light receiving element 5 is applied to the non-inversion input terminal of a comparator 9, the inversion input terminal of which is connected to a common terminal a of a transfer switch 10. A series circuit of a constant current source 11 and resistors 12 and 13 is connected to the positive terminal $V_{DD}$ of a power source (not shown). The connecting point of the constant current source 11 and the resistor 12 is connected to a terminal b of the transfer switch 10, and the connecting point of the resistors 12 and 13 is connected to a terminal c of the switch 10. The output $M_O$ of the comparator 9 is applied to a clock pulse generating circuit 7, which applies drive pulses $\phi_A$, $\phi_B$, SHUNT and $A_S$ to the photoelectric conversion section 1. The output $A_S$ of the clock pulse generating circuit 7 is applied to the gate of a shunt switch 6 composed of an n-channel MOS FET. The drain of the shunt switch 6 is connected to the light receiving element 5. The output VIDEO of the light receiving element is inputted to a saturation detecting circuit 8, the output of which is employed as a control input to the transfer switch 10.

The operation of the circuit shown in FIG. 1 will be described with reference to FIGS. 2, 3, 4 and 5. FIG. 5 illustrates a concrete example of the clock pulse generating circuit 7 in FIG. 1. In FIG. 5, a resistor 7-1, a capacitor 7-2, and inverters 7-3 and 7-4 form an oscillating circuit, the oscillation frequency of which is determined by the resistance of the resistor 7-1 and the capacitance of the capacitor 7-2. The output of the oscillating circuit is applied through an inverter 7-5 to frequency division circuits 7-6 through 7-10. The output $\overline{Q}$ of the frequency division circuit 7-10 is applied to the clock terminal C of a D flip-flop 7-11, the output Q of which is applied to the reset terminals R of frequency division circuits 7-6 through 7-10. The output $M_O$ of the comparator 8 and the output Q of the D flip-flop 7-11 are applied to an AND circuit 7-12, the output of which is inputted to the reset terminal R of the D flip-flop 7-11. NAND circuits 7-13 and 7-14, an AND circuit 7-15, an OR circuit 7-16 and inverters 7-17 and 7-18 form the aforementioned pulses $\phi_A$, $\phi_B$, $A_S$ and SHUNT.

The operation of the circuit shown in FIG. 5 will be described with reference to a time sequence diagram in FIG. 4. In an initial state, the terminal $M_O$ is at a low logic level (hereinafter referred to merely as "L") and the output Q of the D flip-flop 7-11 is at a high logic level (hereinafter referred to merely as "H"). Under this condition, the frequency division circuits 7-6 through 7-10 are in the reset state. When the level of the terminal $M_O$ is raised to "H", the D flip-flop 7-11 is reset, and the reset states of the frequency division circuits 7-6 through 7-10 are released, as a result of which the output of the oscillating circuit is subjected to frequency division to form the pulses $\phi_A$, $\phi_B$, $A_S$ and SHUNT. When the output $\overline{Q}$ of the frequency division circuit 7-10 is raised to "H" from "L", the D flip-flop 7-11 is triggered, while the output Q is raised to "H", as a result of which the frequency division circuits 7-6 through 7-10 are again reset; that is, they are placed in the initial state.

Figure 2:
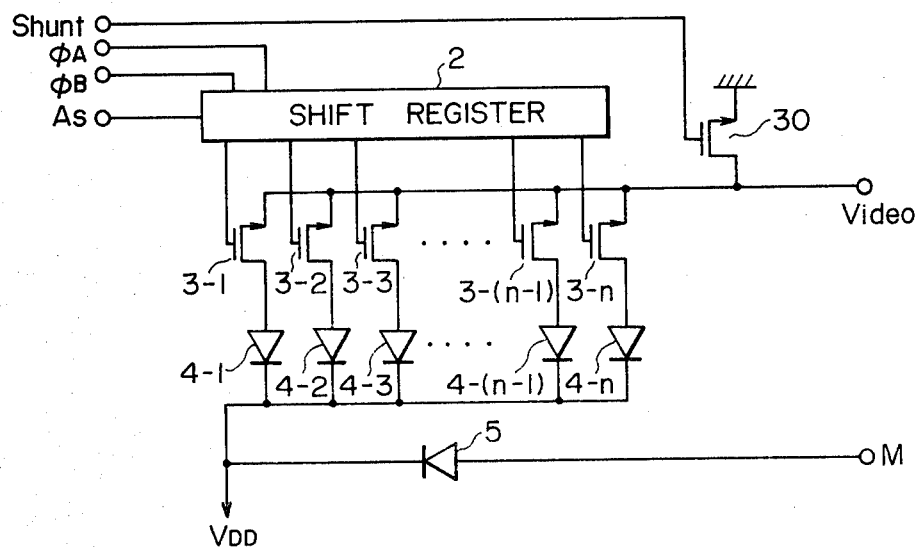
FIG. 2 is a diagram showing one example of a photo-electric conversion section of FIG. 1.

FIG. 2 shows a concrete example of the photo-electric conversion section 1 in FIG. 1. In FIG. 2, reference numeral 2 designates the shift resistor in FIG. 1. The MOS switch array 3 in FIG. 1 is made up of n-channel MOS FETS 3-1, 3-2, 3-3, . . . 3-(n-1) and 3-n, and the light receiving element array 4 is composed of light receiving elements 4-1, 4-2, 4-3, . . . 4-(n-1) and 4-n, as shown in FIG. 2. Further in FIG. 2, reference numeral 30 designates an n-channel MOS FET which receives the pulse SHUNT to reset the line VIDEO; while numeral 5 represents the light receiving element mentioned above. The cathode of the light receiving element 5 is connected to the terminal $V_{DD}$. The shift register 2 is operated by the two-phase pulses $\phi_A$ and $\phi_B$ as is well known. When the start pulse $A_S$ is applied to the shift register 2, the n-channel MOS FETS 3-1 through 3-n are rendered conductive one after another to scan the light receiving elements 4-1 through 4-n successively, to thereby take out the charges accumulated in the light receiving elements 4-1 through 4-n. When the pulse SHUNT is at "H", the n-channel MOS FET 30 is rendered conductive to reset the line VIDEO.

Figure 4:
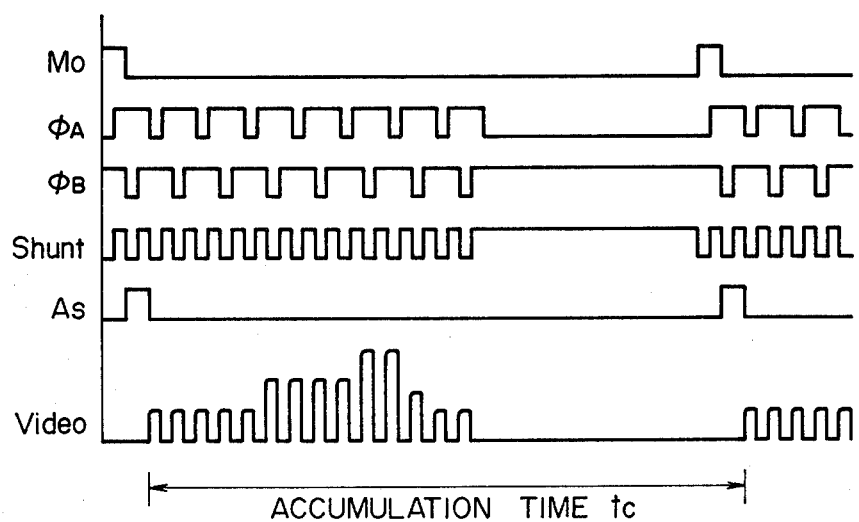
FIG. 4 is a timing chart illustrating the operation of a clock pulse generating circuit.
Figure 5:
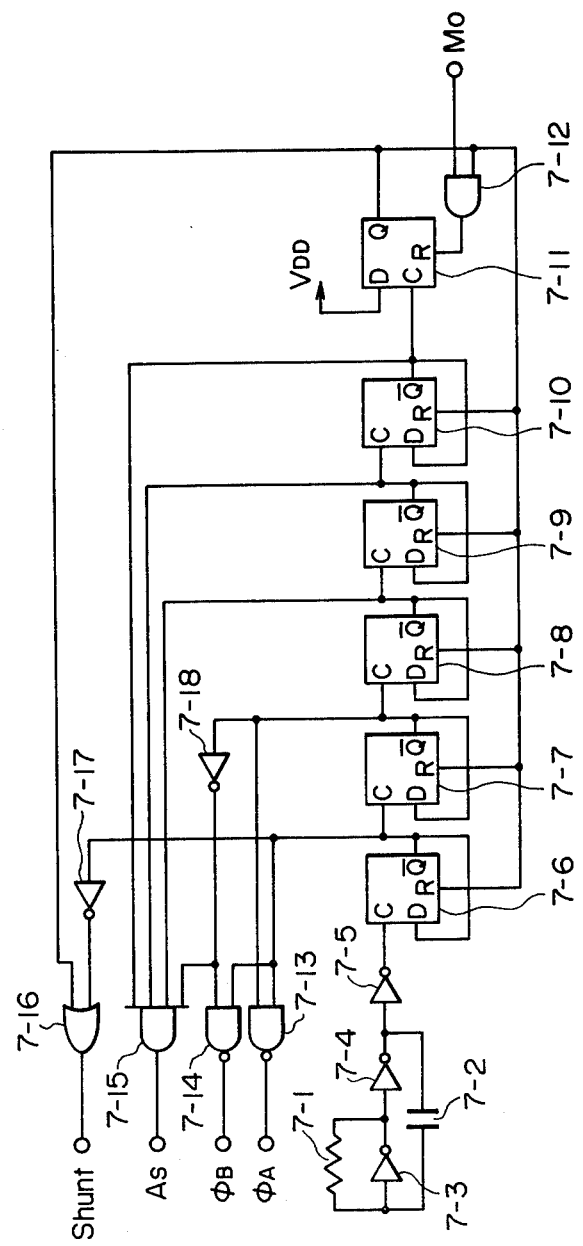
FIG. 5 is a diagram showing one example of the clock pulse generating circuit of FIG. 1.

The output VIDEO is as shown in FIG. 4. The period of the start pulse $A_S$ is the accumulation time ($t_c$) during which charges are accumulated in the light receiving elements 4-1 through 4-n.

Concrete examples of the saturation detecting circuit 8 and the transfer switch 10 in FIG. 1 will be described with reference to FIG. 3.

Figure 3:
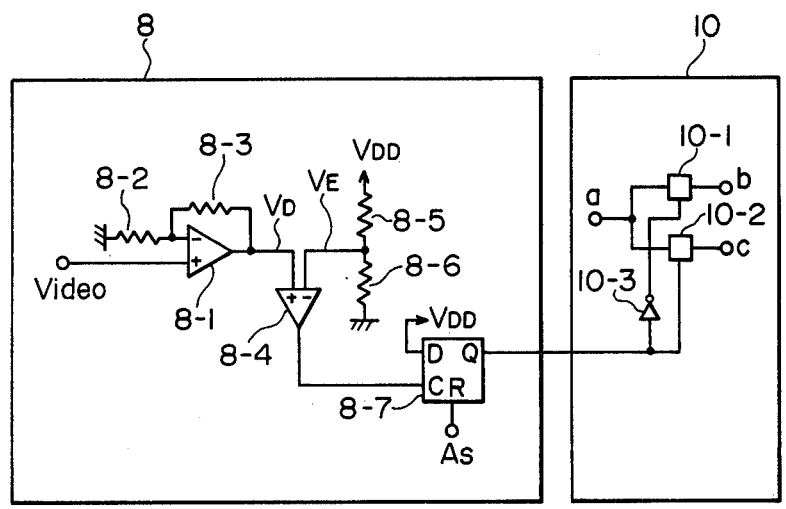
FIG. 3 is a diagram showing examples of a saturation detecting circuit and a transfer switch of FIG. 1.

In FIG. 3, reference character 8-1 designates a high input impedance operational amplifier, to the non-inversion input terminal of which is applied the aforementioned output VIDEO. A non-inversion amplifier is formed with the aid of resistors 8-3 and 8-2. The output of the high input impedance operational amplifier 8-1 is applied to the non-inversion input terminal of a comparator 8-4, the inversion input terminal of which is connected to the connecting point of resistors 8-5 and 8-6 which are adapted to divide the voltage of the power source $V_{DD}$. The output of the comparator 8-4 is applied to the clock terminal C of a D flip-flop 8-7. The start pulse $A_S$ is inputted to the terminal R of the D flip-flop 8-7, the terminal D of which is connected to the power source $V_{DD}$. The terminal Q of the D flip-flop 8-7 is connected to the transfer switch 10. The transfer switch 10 is made up of bi-lateral switches 10-1 and 10-2 and an inverter 10-3. When the output Q of the D flip-flop 8-7 is at "L", the bi-lateral switch 10-1 is turned on while the bi-lateral switch 10-2 is turned off, so that the terminal a is electrically connected to the terminal b. When the output Q of the D flip-flop 8-7 is at "H", the terminal a is electrically disconnected from the terminal b.

The operation of the circuit shown in FIG. 3 will now be described. The output VIDEO of the light receiving element array 4 is amplified by the high input impedance amplifier 8-1. The output $V_D$ of the amplifier 8-1 is compared with a voltage $V_E$ which is obtained by voltage-dividing the voltage of the power source with the resistors 8-5 and 8-6, in the comparator 8-4. When $V_D \leq V_E$, the output of the comparator 8-4 is at "L". When $V_D > V_E$, the output of the comparator 8-4 is at "H". If the voltage $V_E$ at the connecting point of the resistors 8-5 and 8-6 is set slightly lower than the saturation voltage of the output VIDEO (or the saturation voltage of the high input impedance amplifier 8-1), at the moment when the output VIDEO is saturated, the output of the comparator 8-4 is raised to "H", while the output Q of the D flip-flop 8-7, being triggered, is raised to "H" from "L". The D flip-flop 8-7 is reset by the start pulse $A_S$, so that the output Q is set to "L". When the output Q of the D flip-flop 8-7 is raised to "H" from "L", the terminal a of the transfer switch 10 is electrically connected to the terminal c, from the terminal b.

The operations of the photo-electric conversion section 1, the clock pulse generating circuit 7, the saturation detecting circuit 8 and the transfer switch 10 are as described above. Now, the operation of the circuit in FIG. 1 will be described.

The output VIDEO provided as described above is proportional to the product of the intensity of the light applied to the light receiving elements in the light receiving element array 4 and the accumulation times of the same, and the intensity of illumination is proportional to the optical current in each light receiving element, as is well known in the art. Therefore, $$V_O(k) = K_1 \cdot i_P(k) \cdot t_c \tag{1}$$

where $V_O(k)$ is the video output of the k-th bit; $i_p(k)$ is the optical current of the k-th bit; $t_c$ is the accumulation time; and $K_1$ is a proportional constant.

On the other hand, the signal $M_O$ for forming the start pulse $A_S$ to control the accumulation time is formed by the light receiving element 5, the shunt switch 6, the comparator 9, the constant current source 11, the resistors 12 and 13, and the transfer switch 10. When the start pulse $A_S$ is raised to "H", shunt switch 6 is turned on, so that the terminal M is grounded. When the start pulse $A_S$ is next set to "L", the level of the terminal M is raised. If the optical current of the light receiving element 5 is represented by $i_{PM}$, then the output voltage $V_M$ of the light receiving element t is:

$$V_M = i_{PM} t / C_M \tag{2}$$

where t is the time interval which elapses from the instant that the start pulse $A_S$ is set to "L", and $C_M$ is the capacitance at the terminal M. The capacitance at the terminal M is represented by $C_M$ as defined above, which is the sum of the junction capacitance of the light receiving element 5, the drain-source capacitance of the shunt switch 6 and other stray capacitances.

The voltage $V_B$ at the terminal b of the transfer switch 10 is:

$$V_B = i_1(R_1+R_2) \quad (3)$$

where $i_1$ is the current value of the constant current source 11, and $R_1$ and $R_2$ are the resistance of the resistors 12 and 13, respectively. The voltage $V_C$ at the terminal c of the transfer switch 10 is:

$$V_C = i_1 \cdot R_1 \quad (4)$$

Under the condition where the terminal a is electrically connected to the terminal b in the transfer switch 10, when the output voltage of the light receiving element 5 given by the expression (2) reaches a voltage which is defined by the expression (3), the output of the comparator 9 is raised to "H" from "L". The time $t_1$ which elapses until the output level is changed is determined from the expressions (2) and (3) as follows:

$$t_1 = C_M \cdot i_1(R_1+R_2)/i_{PM} \quad (5)$$

On the other hand, under the condition that the terminal a of the transfer switch 10 is electrically connected to the terminal c, the time $t_2$ which elapses until the output level is changed is:

$$t_2 = C_M \cdot i_1 \cdot R_1/i_{PM} \quad (6)$$

If $R_1/(R_1+R_2) = \alpha$, then the expression (6) can be rewritten as follows:

$$t_2 = \alpha \cdot t_1 \quad (7)$$

These times $t_1$ and $t_2$ define the period of the start pulse $A_S$ which is equal to the accumulation time $t_c$ of the light receiving element array. Therefore, under the condition that the terminals a and b are electrically connected to each other in the transfer switch 10, the video output can be represented by the following expression (8):

$$V_O(k) = K_1 i_P(k) C_M i_1 (R_1+R_2)/i_{PM} \quad (8)$$

where $C_M$ is a constant, and $i_1$, $R_1$ and $R_2$ can be set as required. Therefore, $$V_O(k) = K_2 i_P(k)/i_{PM} \quad (9)$$

where $$K_2 = K_1 C_M i_1 (R_1+R_2)$$

The relation between the optical current $i_P(k)$ of each bit in the light receiving element array 4 and the optical current $i_{PM}$ of the light receiving element 5 is as follows:

$$i_{PM} = K_3 \sum_{k=1}^{n} i_P(k) \quad (10)$$

where $K_3$ is a constant, and n is a constant (or the number of bits in the light receiving element array 4). When the expression (10) is inserted in the expression (9), the following expression (11) is obtained:

$$V_O(k) = K_4 i_P(k)/\sum_{k=1}^{n} i_P(k) \quad (11)$$

where $K_4 = K_2/K_3$

When the terminals a and c are electrically connected to each other in the transfer switch 10, the video output $V_O(k)'$ is:

$$V_O(k)' = \alpha V_O(k) = \alpha K_4 \cdot i_P(k)/\sum_{k=1}^{n} i_P(k) \quad (12)$$

As is apparent from the expression (11), the average value of the output VIDEO is constant irrespective of the intensity of light on the light receiving element array at all times, and therefore the device is operable over a wide range of illumination intensity. When high intensity light is applied to several bits in the light receiving element array and low intensity light is applied to the remaining bits, the device operates so that the average value of the outputs of the bits is constant, and therefore the several bits under high intensity light are saturated. This saturation is detected by the saturation detecting circuit 8, whereupon the terminal a is electrically connected to the terminal c in the transfer switch 10. Since $\alpha < 1$, the video output is then not saturated.

Figure 6:
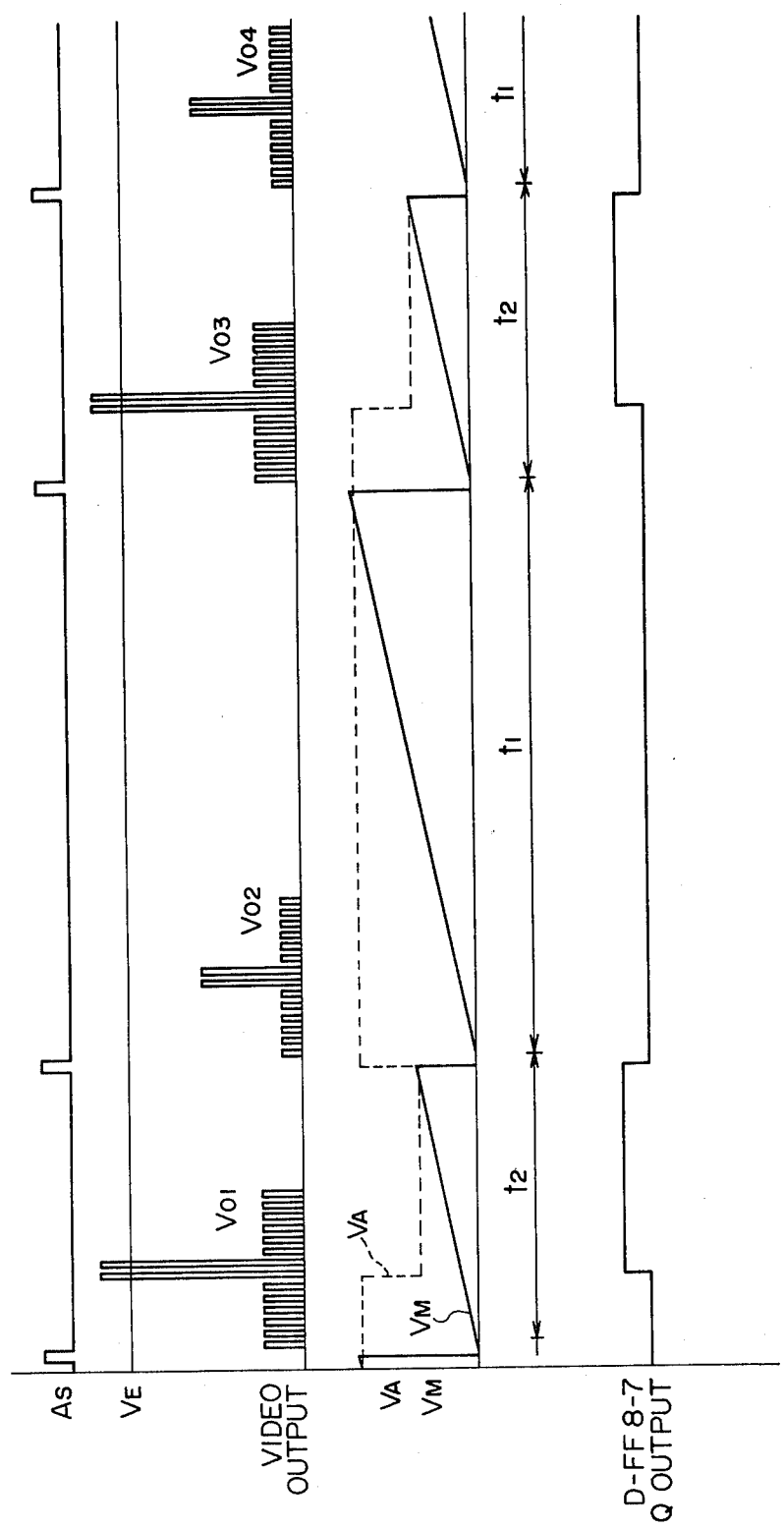
FIG. 6 is a time chart illustrating the operation of the embodiment shown in FIG. 1.

FIG. 6 is a time chart for a description of the operation of the circuit in FIG. 1. When the start pulse $A_S$ is outputted, the light receiving element array outputs the signal VIDEO. When the signal VIDEO ($V_{01}$) exceeds the saturation level $V_E$, the output Q of the D flip-flop 8-7 is raised to "H" and the non-inversion input voltage $V_A$ of the comparator 9 becomes equal to the voltage $V_C$. Therefore, if $\alpha = 0.5$, the next output VIDEO ($V_{02}$) is:

$$V_{02} = V_{01}/2$$

That is, it is lower than the saturation level $V_E$. The non-inversion input voltage $V_A$ of the comparator 9 becomes equal to the voltage $V_B$, and the accumulation time is increased to $t_1$ ($=2t_2$) and the next output VIDEO ($V_{03}$) is saturated. In other words, the output VIDEO undergoes saturation and non-saturation alternately. If the device is so designed that, when the output Q of the flip-flop 8-7 is at "H", the output VIDEO can be disregarded, then a non-saturated output VIDEO, i.e., an active output VIDEO can be obtained at all times.

Let us consider the case where the invention is applied to detection of the contrast of an object in an automatic focusing camera. Correct information on the contrast output cannot be obtained if the output VIDEO is saturated; however, in the invention, the saturated and non-saturated outputs VIDEO are obtained alternately; and therefore the correct contrast can be obtained by processing the non-saturated output only.

As is apparent from the above description, according to this aspect of the invention, the saturation of the output VIDEO is detected to reduce the accumulation time to thereby make the output VIDEO non-saturated. Therefore, with respect to optical information on all illumination differences, information lower than the saturation level can be obtained, which increases the operable range of application of the device.

Figure 7:
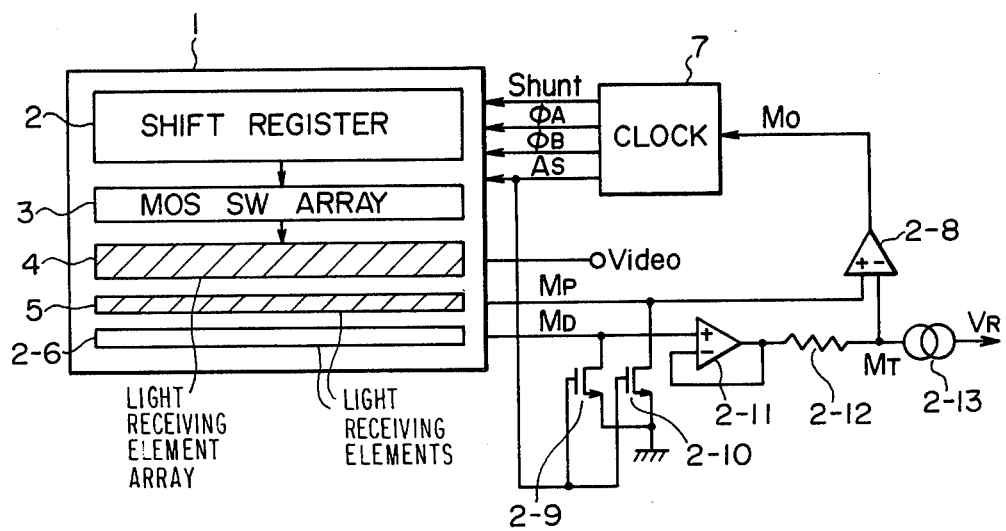
FIG. 7 illustrates a second embodiment of the invention in block diagram form.

FIG. 7 illustrates a second embodiment of the invention, wherein means are provided for nullifying the effect of any leakage current in the photo-electric conversion block. The device of FIG. 7 contains many elements similar to those in the FIG. 1 device, including shift register 2, MOS switch array 3, light receiving array 4 and light responsive element 5. In addition, the FIG. 7 device employs the clock pulse generating circuit 7 described in connection with FIG. 5.

The FIG. 7 device includes an additional light receiving element 2-6, which is, for reasons discussed hereafter, shielded from light by an aluminum mask. The output $M_D$ of the light receiving element 2-6 is applied to a high input impedance buffer 2-11, to the output terminal of which one terminal of a resistor 2-12 is connected. A constant current source 2-13 is connected between the other terminal of the resistor 2-12 and the positive terminal $V_{DD}$ of a power source (not shown). The connecting point $M_T$ of the resistor 2-12 and the constant current source 2-13 is connected to the inversion input terminal of a high input impedance comparator 2-8, to the non-inversion input terminal of which the output $M_P$ of the light receiving element 5 is applied. The output $M_O$ of the comparator 2-8 is applied to the clock pulse generating circuit 7 (FIG. 5) which applies drive pulses $\phi_A$, $\phi_B$, $A_S$ and SHUNT to the photo-electric conversion section 1. The output $A_S$ of the clock pulse generating circuit 7 is inputted to shunt switches 2-9 and 2-10 which are composed of n-channel MOS FETs. The drains of the shunt switches 2-9 and 2-10 are connected to the light receiving elements 2-6 and 5, respectively. The output of the light receiving element array 4 is provided, as before, at its terminal VIDEO.

Figure 8:
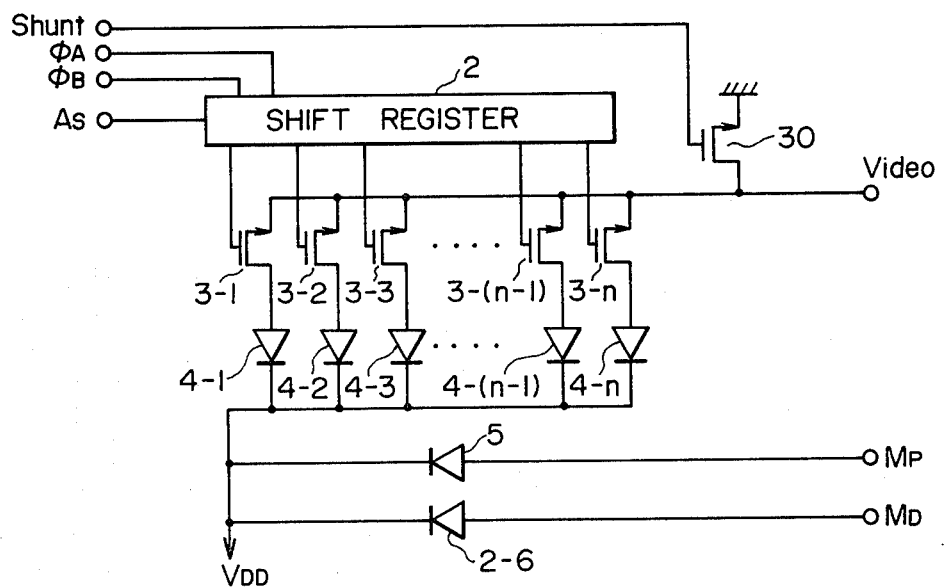
FIG. 8 illustrates the photo-electric conversion section of FIG. 7.

The clock pulse generating circuit 7 operates as described above, receiving as an input the signal $M_O$ from comparator 2-8, and outputting the signals SHUNT, $\phi_A$, $\phi_B$, and $A_S$ (FIG. 4). Those signals are in turn received by the photo-electric conversion section 1, shown in detail in FIG. 8. It will be noted that the p-e conversion section of FIG. 8 is identical to that of FIG. 2, but for the addition of light receiving element 2-6, in parallel with element 5. Thus, the output VIDEO is derived as previously discussed in connection with FIGS. 2 and 4. In particular the video output may be represented as:

$$V_O(k) = K_1 \cdot i_P(k) \cdot t_c$$

where $V_O(k)$ is the video output of the k-th bit; $i_p(k)$ is the optical current of the k-th bit; $t_c$ is the accumulation time; and $K_1$ is a proportional constant.

In FIG. 7, the signal $M_O$ for forming the start pulse $A_S$ to control the accumulation time is formed by the light receiving elements 5 and 2-6, the shunt switches 2-9 and 2-10, the buffer 2-11, the resistor 2-12, the constant current source 2-13 and the comparator 2-8. When the start pulse $A_S$ is raised to "H", the shunt switches 2-9 and 2-10 are turned on and the terminals. $M_P$ and $M_D$ are therefore grounded (or have the ground level). When the start pulse $A_S$ is set to "L", the levels of the terminals $M_P$ and $M_D$ are raised. If the optical current of the light receiving element 5 is represented by $i_{PM}$ and the leakage current by $i_D$, then the output voltage $V_P$ of the light receiving element 5 is:

$$V_P = (i_{PM} + i_D) t / C_M \quad (13)$$

where t is the time interval which elapses from the instant that the start pulse $A_S$ is set to "L" until the start pulse is raised to "H", and $C_M$ is the capacitance at the terminal $M_P$. The capacitance at the terminal $M_P$ is represented by $C_M$ as described above, which is the sum of the junction capacitance of the light receiving element 5, the drain-source capacitance of the shunt switch 2-10 and other stray capacitances.

As the light receiving element 2-6 is shielded from light by the aluminum mask, its optical current is zero. If the light receiving elements 5 and 2-6 are formed symmetrically, the capacitance at the terminal $M_D$ is equal to that at the terminal $M_P$. Therefore, the output voltage $V_D$ of the light receiving element 2-6 is:

$$V_D = i_D \cdot t / C_M \quad (14)$$

The output of the light receiving element 2-6 is applied to the buffer 2-11, and therefore the output of the buffer 2-11 is varied as indicated by the expression (14).

If the current value of the constant current source 13 is expressed by $i_1$ and the resistance of the resistor 12 by $R_1$, then the potential difference $V_R$ is:

$$V_R = i_1 \cdot R_1 \quad (15)$$

The voltage $V_A$ at the inversion input terminal $M_T$ of the comparator 2-8 is:

$$V_A = V_D + V_R \quad (16)$$

The voltage at the non-inversion input terminal of the comparator 2-8 is $V_P$ is defined by expression (13). Therefore, the level at which the comparator 2-8 is changed to "H" from "L" is $V_A = V_P$, and the time interval t which elapses for the change is represented by the following expression derived from the expressions (13) and (16):

$$t = V_R \cdot C_M / i_{PM} \quad (17)$$

The time t determines the period of the start pulse $A_S$ and is equal to the accumulation time $t_c$ of the light receiving element array. Therefore, if the expression (17) is inserted in expression (1), which applies equally to FIG. 7, then $$V_O(k) = K_1 \cdot i_P(k) \cdot V_R \cdot C_M / i_{PM}$$

where $C_M$ is a constant, and $V_R$ is a voltage which can be set as required. If this voltage is fixed, the following expression is obtained:

$$V_O(k) = K_2 \cdot i_P(k) / i_{PM} \quad (18)$$

where $$K_2 = K_1 \cdot V_R \cdot C_M$$

Again, the relation between the optical current $i_P(k)$ of each bit of the light receiving element array 4 and the optical current $i_{PM}$ of the light receiving element 5 is $$i_{PM} \approx K_3 \sum_{k=1}^{n} i_p(k) \quad (19)$$

where $K_3$ is a constant, and n is a constant (or the number of bits in the light receiving element array 4).

If this expression is inserted in the expression (18), then the following expression is obtained:

$$V_O(k) = K_4 \cdot i_p(k) / \sum_{k=1}^{n} i_p(k) \quad (20)$$

where $$K_4 = K_2/K_3.$$

The present device is operable over a wide range of illumination intensities and is applicable to the detection of the contrast of an object with an automatic focusing camera. Even if the light receiving element 5 involves a leakage current, the light receiving element 2-6 compensates for it, and therefore the device is operable at low intensity illumination. The aforementioned leak current doubles when the temperature increases by 10° C.; however, the device of the invention is not affected by the leakage current, and therefore can operate at low intensity illumination and at high temperature.

Since the photo-electric conversion section 1, the clock pulse generating circuit 7, the shunt switches 9 and 10, the buffer 11 and the comparator in the device of the invention can be formed as a single MOS integrated circuit, it can easily be miniaturized.

In the above-described devices, the shift register 2, the MOS switch array 3 and the light receiving element array 4 are nominally of the MOS type; however, CCDs may be employed.

What is claimed is:

1. A photo-electric conversion device, comprising: a light receiving element array for accumulating information on incident light through an accumulation effect; means for scanning the light receiving element array; and light receiving means provided adjacent said light receiving element array and providing an output in response to received light, said output from the light receiving means being utilized to control an accumulation time of said light receiving element array, said device further comprising saturation detecting means for detecting saturation of an output of said light receiving element array; and means for further varying said accumulation time in response to an output of said saturation detecting means;

said accumulation time being reduced when said output of said light receiving element array is saturated.

2. A device as claimed in claim 1, wherein said means for varying said accumulation time comprises:
   a source of voltage;
   transfer switch means for varying said voltage according to the output of said saturation detecting circuit;
   shunt means for discharging said light receiving element;
   comparator means for receiving said voltage and said output of said light receiving means;
   clock pulse generating means for generating, when an output level of said comparator is inverted, a start pulse which scans light receiving element array.

3. A device as claimed in claim 2, said saturation detecting means comprising comparison means for comparing the output voltage of said array with a reference voltage set slightly lower than a saturation voltage, and means for triggering said transfer switch when said reference voltage is exceeded to thereby lower said voltage received by said comparator means.

4. A device as claimed in claim 2, wherein said clock pulse generator comprises oscillator circuit means, frequency division circuits for subjecting an output of said oscillator to frequency division upon detecting a high level output from said comparator, to form signals for operating a shift register of said device controlling said scanning, for resetting the output of said array, and said start pulse, and means for resetting said frequency division circuits.

5. A device as claimed in claim 4, wherein said accumulation time is reduced by a predetermined factor upon saturation of said array output, whereby the value of said next array output is lowered, said accumulation time being equal to the duration of said start pulse.

* * * * *